W. H. OPITZ.
TIRE ARMOR.
APPLICATION FILED APR. 28, 1916.

1,234,075.

Patented July 17, 1917.

Inventor
W. H. Opitz

Witnesses
A. C. Newkirk
P. M. Smith

By Victor J. Evans
Attorney

UNITED STATES PATENT OFFICE.

WILLIAM H. OPITZ, OF BEDFORD, INDIANA.

TIRE-ARMOR.

1,234,075.

Specification of Letters Patent.   Patented July 17, 1917.

Application filed April 28, 1916.   Serial No. 94,220.

*To all whom it may concern:*

Be it known that I, WILLIAM H. OPITZ, a citizen of the United States, residing at Bedford, in the county of Lawrence and State of Indiana, have invented new and useful Improvements in Tire-Armors, of which the following is a specification.

This invention relates to tire armors, the object in view being to provide in connection with a tire of the type having knobs of different shapes on the tread surface thereof, metal caps or covers for such knobs which will materially reduce the liability of puncture and also practically eliminate all liability of cuts in the tread surface of the tire.

Another object of the invention is to produce armor caps of the character referred to which are so constructed and formed that they may be vulcanized upon the knobs or projections of the tire during the process of manufacture or applied and fastened to said knobs subsequently thereto. Thus in case any of the caps become worn out or displaced, other caps may be readily substituted therefor.

With the above and other objects in view, the invention consists in the novel construction, combination and arrangement of parts, as herein described, illustrated and claimed.

In the accompanying drawings:—

Figure 1:
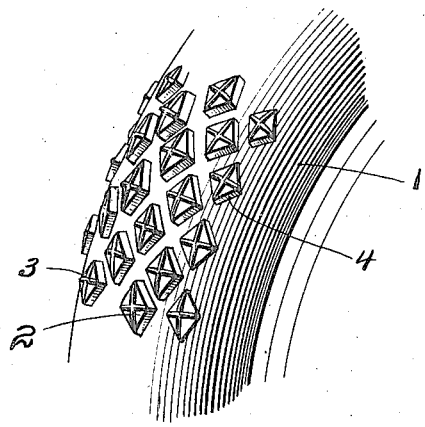
Figure 1 is a fragmentary perspective view illustrating the caps of this invention applied to knobs or projections of diamond shape.
Figure 2:
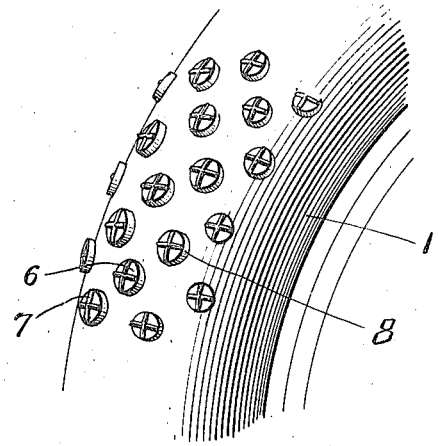
Fig. 2 is a similar view showing caps applied to knobs which are round or substantially so.

Referring to the drawings 1 designates the outer casing of a pneumatic tire, the casing in Fig. 1 being shown as provided with diamond-shaped knobs and the casing in Fig. 2 being shown as provided with round or disk-shaped knobs.

Figure 3:
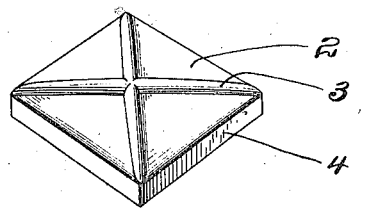
Fig. 3 is an enlarged perspective view looking toward the outer face of one of the caps of Fig. 1.
Figure 4:
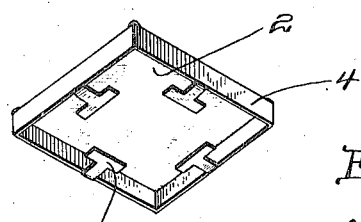
Fig. 4 is an inverted view of the same.

Referring now to Figs. 3 and 4 it will be observed that each of the caps shown in Fig. 1 is substantially square or diamond-shaped being quadrilateral and comprising a main body 2 having on the outer exposed or tread surface thereof intersecting and projecting ribs 3 to prevent skidding and to provide additional traction. Each cap also comprises the inwardly extending surrounding flange 4 from which extend inwardly T-shaped keys 5.

Figure 5:
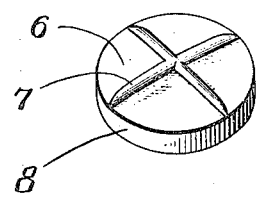
Fig. 5 is a perspective view of one of the caps shown in Fig. 2.
Figure 6:
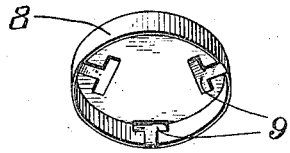
Fig. 6 is an inverted view of the same.

In the form of the cap illustrated in Figs. 2, 5 and 6, each cap comprises a substantially disk-shaped body 6 with intersecting ribs 7 on the outer face thereof having the same function as the ribs 3 above referred to, said cap also comprising a substantially circular inwardly extending flange 8 having projecting inwardly therefrom T-shaped keys 9.

Under the arrangement illustrated in Figs. 3, 4, 5 and 6, the keys are adapted to be embedded or molded directly in the rubber during the process of molding the rubber and forming the knobs either of the shape shown in Fig. 1 or the shape shown in Fig. 2.

Figure 7:
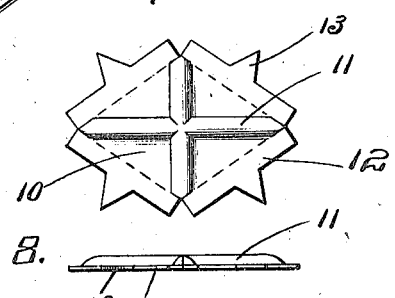
Fig. 7 is a plan view of the blank of a diamond-shaped cap before bending the same.
Figure 8:
Fig. 8 is an edge view thereof.

In Figs. 7 and 8 I have illustrated a cap substantially of diamond shape formation the body of which is indicated at 10, intersecting ribs 11 being struck outwardly from the tread face thereof and serving the same function as the ribs 3 and 7 hereinabove referred to. The members 12 which when bent at right angles to the plane of the body 10 serve as flanges are primarily stamped from sheet metal with the body 10 and the other parts of the device or blank, all parts primarily lying in the same common plane. The ribs 11 are then pressed outwardly by suitable dies and in the formation of the blank, keys 13 are provided, the same extending outwardly from the edges of the flanges 12 and adapted to be bent inwardly and driven or pressed into the knobs on the tire in order that the cap may be securely anchored to the knob and retained in place during actual service. Such a cap as shown in Figs. 7 and 8 may be applied to any knob of the tire in case the knob previously applied thereto has become unfit for further use.

It will be understood that the caps are composed of sheet metal of any suitable gage and that the invention is not restricted to any particular shape of cap as the shape of the cap will vary in accordance with the shape of the knob on the tire to which it is to be applied. When in place, they materially reduce the liability of puncture, the weakening of the tire and subsequent blow outs incident thereto and they practically eliminate all danger of serious cuts in the portions of the tire not protected by the metal caps.

The arrangement of the rubber knobs on the tire surface is not restricted, but attention may be called to the fact that the closer the knobs to each other, the higher will be the percentage of safety in regard to punctures and cuts, thus increasing the life of the tire.

I claim:—

A resilient tire having knobs projecting from the outer face of the body thereof, in combination with metal caps conforming in shape to and inclosing said knobs, each cap comprising a body portion covering the outer face of the knob, a flange extending from the body inwardly toward the body of the tire and protecting the side walls of the knob, and a plurality of keys extending toward each other from said flange and embedded in the knob outside of the surface of the tire body.

In testimony whereof I affix my signature.

WILLIAM H. OPITZ.